United States Patent [19]

Müller

[11] Patent Number: 5,886,138

[45] Date of Patent: Mar. 23, 1999

[54] PROCESS FOR THE PREPARATION OF TETRAHYDROFURAN POLYMERS

[76] Inventor: Herbert Müller, Carostrasse 53, D-Frankenthal, 67227, Germany

[21] Appl. No.: 875,338

[22] PCT Filed: Jan. 23, 1996

[86] PCT No.: PCT/DE96/00088

§ 371 Date: Jul. 30, 1997

§ 102(e) Date: Jul. 30, 1997

[87] PCT Pub. No.: WO96/23833

PCT Pub. Date: Aug. 8, 1996

[30] Foreign Application Priority Data

| Jan. 31, 1995 | [DE] | Germany | 195 02 970.4 |
| Apr. 21, 1995 | [DE] | Germany | 195 14 826.6 |
| Jun. 14, 1995 | [DE] | Germany | 195 21 602.4 |

[51] Int. Cl.$^6$ ............... C08G 65/20; C08G 65/10
[52] U.S. Cl. ............ 528/408; 528/413; 528/416; 528/417; 568/617; 568/624; 560/240; 560/252
[58] Field of Search .............. 528/408, 413, 528/416, 417; 568/617, 624; 560/240, 252

[56] References Cited

U.S. PATENT DOCUMENTS

| 4,728,722 | 3/1988 | Mueller | 528/413 |
| 4,803,299 | 2/1989 | Mueller | 560/240 |
| 5,208,385 | 5/1993 | Kahn et al. | 568/617 |
| 5,210,283 | 5/1993 | Kahn et al. | 560/240 |

FOREIGN PATENT DOCUMENTS

| 0239787 | 2/1987 | European Pat. Off. | C08G 65/20 |
| 0241890 | 4/1987 | European Pat. Off. | C08G 65/20 |
| 9405719 | 3/1994 | WIPO | C08G 65/20 |

OTHER PUBLICATIONS

An Overview of Attapulgite and its Applications; Prepared by ITC Co.; Nordmann, Rassmann GmbH & Co. (Hamburg, Germany); Excerpts by Ed Sawyer and presented to Amer. Inst. of Mining Engineers; pp. 1–5.

*Primary Examiner*—Frederick Krass
*Attorney, Agent, or Firm*—Fulbright & Jaworski, LLP

[57] ABSTRACT

A process for the continuous and discontinuous production of tetrahydrofuran polymers by homopolymerizing tetrahydrofuran or copolymerizing tetrahydrofuran with 1,2-alkylene oxides in the presence of compounds with reactive hydrogen or carboxylic acid anhydrides on an acid-treated, calcined and granulated aluminium silicate catalyst which may consist of amorphous aluminium silicate, a zeolite or kaolin. By keeping the concentration of carboxylic acid anhydride or alkylene oxide constant below 1 wt. % in the polymerization recipe throughout the polymerization it is possible to largely prevent the formation of cyclic ethers and to obtain a polymer with a very narrow molecular weight distribution. In granular form, the catalysts exhibit a hitherto unknown activity and form polymers with a very narrow molecular weight distribution and low color and acid numbers.

10 Claims, 1 Drawing Sheet

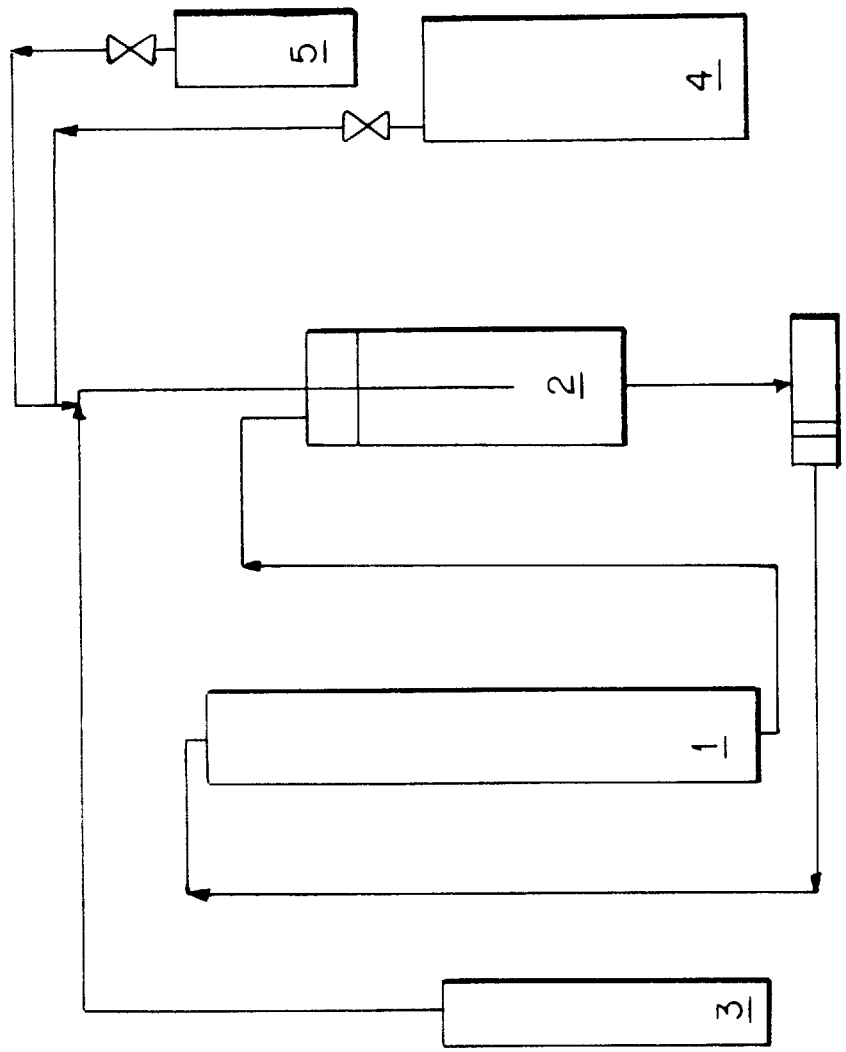

PROCESS FOR THE PREPARATION OF TETRAHYDROFURAN POLYMERS

BACKGROUND OF THE INVENTION

The present relation relates to a process for batchwise or continuous preparation of tetrahydrofuran polymers by homopolymerization of tetrahydrofuran or copolymerization of tetrahydrofuran with 1,2-alkylene oxides in the presence of acid-activated and calcined aluminium silicate, in which process homo- and copolymers are obtained which have a particularly narrow molecular weight distribution, contain a negligible amount of oligomeric cyclic ether contaminants and have low color and acid numbers.

The catalytic synthesis of tetrahydrofuran polymers on aluminium silicates is well known. British patent No. 845 948 describes a process for copolymerizing tetrahydrofuran with alkylene oxides, in which the polymerization is carried out in the presence of compounds with reactive hydrogen and bleaching-earth catalysts. In this process, relatively large amounts of low-molecular-weight products consisting predominantly of oligomeric cyclic ethers are obtained as byproducts. The molecular weight distribution of the tetrahydrofuran polymers is very broad. Depending on the average molecular weight, it can assume a polydispersity $M_w/M_n$ of 3 to 4 for the molecular weight range from 1000 to 2000 ($M_w$: weight-average molecular weight; $M_n$: number-average molecular weight). The polymers are altogether yellowish in color, are for the most part not strictly bifunctional and have an acid number (usually >0.1 mg KOH/g) which makes them unsuitable for further processing to polyesters and polyurethanes.

The homopolymerization of tetrahydrofuran to polybutylene glycol diacetates using montmorillonite silicates as catalysts is described in the German published examined application No. 1226560. Powdered catalysts prove superior to granular ones (cf. column 4, lines 34–36). This process, however, results in products which alone on account of their poor color require costly purification if they are to be processed further. These problems are described in the unexamined German laid open patent application No. 3935750.

The oligomeric cyclic ethers formed during the homo- and copolymerization reactions are undesirable contaminants in the polymers since they represent inert material and lower the quality of the final polymers made from polymeric glycols. Various proposals for reducing their content have already been made. For example, it is proposed in the EP-A 6107 that the copolymers be treated at an elevated temperature with an activated montmorillonite. In the US Patent No. 4127513 it is suggested that a specially activated montmorillonite be used as catalyst. The disadvantages of this process are the high color numbers of the polymers, the relatively low rate of polymerization and an oligomeric cyclic ether content which is still as much as 5 to 6% by weight.

A further proposal for improving the copolymerization of alkylene oxides with tetrahydrofuran under the catalytic action of activated bleaching earth is to be found in the U.S. Pat. No. 4,228,272, which describes the use of bleaching earths with a given specific pore volume, a defined catalytic surface area and a given pore diameter. The oligomer content of 4 wt. % (cf. column 5, lines 14–15) is, however, still too high for the copolymers to be used in the production of polyurethanes, on which higher mechanical demands are made.

As is known, all processes for copolymerizing alkylene oxides with tetrahydrofuran in the presence of bleaching earths result in high-molecular weight copolymers with terminal hydroxyl groups, the copolymers always being contaminated by a variable proportion of macrocyclic ethers without hydroxyl groups. Hence it has also been proposed that the cyclic ethers be removed by way of extraction with hydrocarbons, water or supercritical gases (U.S. Pat. Nos. 4,500,705, 4,251,654 and 4,306,056).

The unexamined German laid open patent application 3 3 46 136 describes a process for the copolymerization of alkylene oxides and tetrahydrofuran where the formation of cyclic oligomeric ethers is prevented from exceeding 2 wt. % by polymerizing continuously in a reactor and adding to the circulating reaction mixture less than 30 wt. % of fresh feed comprising tetrahydrofuran and 1,2-alkylene oxide. The disadvantage of this process is that the resulting polymers have a broad molecular weight distribution, and the polydispersity $M_w/M_n$ exceeds 4 in this case.

From the EP-A-0104 609 it is known that polyoxybutylene oxyalkylene glycolic acid diesters with a low oligomeric cyclic ether content are obtained if the copolymerization of tetrahydrofuran and a 1,2-alkylene oxide is carried out in the presence of carboxylic acid anhydride and bleaching earth with a water content of less than 3 wt. %. However, in this process too, the molecular weight distribution of the copolymers is unsatisfactory. The two recently developed methods of polymerizing with bleaching earths or amorphous aluminium silicates (U.S. Pat. Nos. 5,208,385 and 5,210,283) are not satisfactory either. Only very heterogeneous polymers are obtained, which have the further disadvantages of being colored and having acid numbers >0.1 mg KOH/g.

The EP-A-0239787 contains a proposal for narrowly limiting the molecular weight distribution and reducing the formation of oligomeric cyclic ethers by means of batchwise copolymerization using bleaching earth catalysts in the presence of telogenes with reactive hydrogen atoms and by keeping the concentration of 1,2-alkylene oxide constant but low.

In comparison to these products, there is nevertheless still a need to reduce the molecular weight distribution of both homo- and copolymers with molecular weights between 1000 and 2000 to a value even lower than 1.5 to 2.8, for example to a value between 1.3 and 2.2, and to limit the formation of oligomeric cyclic ethers to less than 2 wt. %. In the desired process low-molecular-weight polymers with an average molecular weight of less than 250 should not be formed at all, or at the most to an extent of 1 wt. %. An additional purification step to remove these products, as is required with the processes currently in use, would then be unnecessary.

OBJECTS AND SUMMARY OF THE INVENTION

The object of the present invention is thus to provide a process for synthesizing high-quality polymers of tetrahydrofuran and copolymers of tetrahydrofuran and 1,2-alkylene oxide, in which the formation of significant amounts of oligomeric cyclic ethers is avoided and colorless polymers or copolymers are obtained which have a narrow molecular weight distribution $M_w/M_n$ of 1.3 to 2.2 for molecular weights in the range from 1000 to 2000, and which have a low acid number.

According to the teaching of the EP-A-104462, the formation of cyclic ether is for the most part an inevitable side reaction of the cationic ring opening polymerization and is little influenced by the catalyst used. It was therefore not possible to predict that the formation of cyclic ethers would be suppressed by using the process according to the invention.

BRIEF DESCRIPTION OF THE DRAWING

The FIGURE is a schematic of a polymerization reaction using a preferred apparatus according to the present invention DETAILED DESCRIPTION.

It was found that in the continuous or batchwise production of tetrahydrofuran polymers by way of polymerization of tetrahydrofuran or copolymerization of tetrahydrofuran with 1,2-alkylene oxide in the presence of carboxylic acid anhydrides or compounds with reactive hydrogen, which are used in quantities of 0.5 to 10 mol % relative to the tetrahydrofuran, the desired advantageous results are obtained if, for example, instead of the bleaching earths or zeolites used in the EP-A-0239787, use is made as catalyst of granular, acid-activated and calcined aluminium silicates, and the concentration of carboxylic acid anhydride or of the 1,2-alkylene oxide in the reaction mixture is kept at a constant value below 1 wt. %.

The 1,2-alkylene oxides used may be substituted or unsubstituted. Examples of substituents include linear or branch ed alkyl groups with 1 to 6, preferably 1 to 2 carbon atoms, phenyl residues, phenyl residues which are substituted with alkyl and/or alkoxy groups having 1 to 2 carbon atoms or with halogen atoms, and halogen atoms, preferably chlorine. Particularly suitable 1,2-alkylene oxides are 1,2-butylene oxide, 2,3-butylene oxide, styrene oxide, epichlorohydrin and, preferably, ethylene oxide and 1,2-propylene oxide.

Suitable carboxylic acid anhydrides are derived from aliphatic or aromatic carboxylic acids with, for example, 2–8 carbon atoms. Examples include acetic anhydride, butyric anhydride, acrylic anhydride and phthalic anhydride.

Telogenes with reactive hydrogen are for example water, mono- or polyhydric alcohols such as methanol, ethanol, propanol, ethylene glycol, butylene glycol, glycerin, neopentyl glycol and 1,4-butandiol, and also—in particular—carboxylic acids with 1 to 8 carbon atoms. Polytetramethylene ether glycol (PTMEG) can also serve as compound with reactive hydrogen for the copolymerization.

The compounds with reactive hydrogen and the carboxylic acid anhydrides are used in quantities of 5 to 20, preferably 0.5–10 mol %, relative to the tetrahydrofuran.

The process is most simply and economically carried out by using acetic anhydride for the homopolymerization or water for the copolymerization. Water and polyhydric alcohols result in the formation of polyether alcohols which can have two or more functional groups. Since polymeric semiesters are obtained when use is made of carboxylic acids, the copolymers containing ester groups are hydrolyzed in the usual manner. This applies likewise to homopolymers with ester groups. Hydrolysis is effected, for example, by heating the homo- or copolymers—with or without inert solvents—with aqueous alkali hydroxides. A more effective method is transesterification, for example with methanol, under the catalytic influence of an alkali alcoholate. Such methods have been described in the U.S. Pat. No. 2,499,725 and in J. Am. Soc. 70.1842.

The aluminium silicates to be used according to the invention as catalysts are easy to obtain and are inexpensive. Aluminium silicate - zeolite mixture, for example, is a refinery catalyst which has many industrial uses, amongst others to catalyze cracking reactions. Compared to naturally-occurring bleaching earths these synthetic aluminium silicates have the considerable advantage that their catalytic activity can be can be adjusted as required by controlling the production process accordingly. Aluminium silicates have acidic centers at their surfaces. The activity and selectivity of the catalysts depend both on the concentration and on the strength of these acidic centers. Amorphous aluminium silicates, which are also used on a large scale in oil refineries as cracking catalysts, are generally synthesized by mixing a dilute waterglass solution with sulfuric acid. This results in the formation of silica gel, to which aluminium sulfate solution and ammonia are added after a given ageing period. The pH is in the slightly acidic range. The aluminium silica gel which forms is filtered off, washed free of foreign ions, dried and calcined. Brönstedt and Lewis acid centers form in keeping with the equations:

$NH_4AlO_2.nSiO_2 \rightarrow NH_3 + HAlO_2.nSiO_2$ and

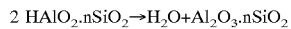

$2\ HAlO_2.nSiO_2 \rightarrow H_2O + Al_2O_3.nSiO_2$

The conditions under which the aluminium silicates are synthesized have a considerable effect on their physical structure. For example, increasing the silicate concentration of the waterglass solution and/or raising the ageing temperature of the silica gel results in catalysts with a higher pore volume and a larger specific surface area. A comprehensive discussion of these interrelations is to be found in a paper published by K. D. Ashley et al. in *Industrial Engineering Chemistry* (1952), 44, p. 2857–2863. In order to obtain the catalyst in a suitable form for the process according to the invention, the powdered catalysts (amorphous silicate and zeolite) can for instance be mixed, made into a paste, extruded to pellets or worked into beads with a diameter of, for example, 4 mm, in a bead-forming machine. The resulting particles are then subjected to a heat treatment to reinforce their structure. This is followed by base exchange with $Al_2(SO_4)_3$ to replace Na ions with Al ions and/or by acid treatment with, for example, hydrochloric acid, then predrying at 140°–170° C. for four hours followed by final drying and calcining at a temperature of 400°–700° C. Homogeneous catalyst beads are obtained having a composition, for example, of 55% $SiO_2$ and 45% $Al_2O_3$, a specific surface area of 150–200 $m^2/g$ and a pore volume of approximately 0.4 $cm^3/g$. The German unexamined laid-open application No. 1803418 describes the preparation of such catalysts. The zeolite content (preferably zeolite X) is in the range from 10–80, preferably 20–60 wt. %.

The process of the invention is carried out continuously or discontinuously using solid-state catalysts. In order to ensure that the mixture of tetrahydrofuran, 1,2-alkylene oxide and the compound with active hydrogen or of tetrahydrofuran and acetic acid anhydride comes into close contact with the catalyst, either the solid state catalyst is moved in the starting components or else the reaction mixture is kept moving over the static disposed catalyst.

In the first case use is, for example made of vessels with an agitating means, in which the catalyst granules are suspended. In the second case the reaction mixture is passed over the fixed-bed catalyst. The latter procedure is preferred for various reasons; the temperature can for example be controlled more accurately, and one can obtain a reaction product which is free of catalyst.

The catalyst in the form of moulded articles is firmly disposed in a reactor, for example simply by pouring. The catalyst bed through which the reaction mixture flows does not need renewing even after extensive use, since the catalyst in the form of moulded articles retains its original solid shape, and do not undergo any abrasion. The catalysts have the advantage of only low activity losses and have an almost unlimited service life.

Suitable reactors for the process according to the invention include, for instance, columnar reaction vessels; the tube diameter needs to be approximately 10 to 100 mm if the heat of reaction in the reaction vessel is to be dissipated. If the temperature is to be regulated by means of a heat exchanger incorporated in an external circuit, use can also be made of a shaft furnace as reactor.

The mixture of starting reagents is made to flow through the reactor, for example by means of a recirculating pump. The concentration of alkylene oxide or of carboxylic anhydride in the reaction mixture is kept below 1 wt. %, preferably between 0.1 and 0.8 wt. % and even more preferably between 0.1 and 0.5 wt. % during the polymerization. At the same time steps are taken to ensure that the concentration of alklyene oxide in the reaction mixture remains essentially constant. What is meant here with an essentially constant concentration of alkylene oxide is a concentration which does not deviate more than 10% from the required level. The reaction mixture is circulated until the desired degree of conversion is obtained. The length of reaction time for which the reaction mixture is pumped over the catalyst disposed in the reactor can vary within relatively wide limits in the case of copolymers, depending on the desired copolymer composition. If, for example, a copolymer is desired with a final composition comprising about 20 wt. % alkylene oxide, and assuming that the concentration of alkylene oxide in the reaction mixture is kept at a constant level of 0.2 wt. % throughout the entire reaction, then a conversion of some 50 wt. % will be obtained after approximately 5 to 10 hours provided the ratio of catalyst volume to reaction mixture circulated per hour is in the range from 1:1 to 1:5. The ratio of the overall volume of reaction components to catalyst volume is between 5:1 and 1:1. The reaction time required is inversely proportional to the alkylene oxide concentration used in the reaction mixture.

It is of advantage if the starting materials tetrahydrofuran and 1,2-alkylene oxide or carboxylic acid anhydride are used in as pure a form as possible. This guarantees a long service life for the catalyst. The tetrahydrofuran can be purified prior to polymerization by pretreating it with strong mineral acids, organic sulfonic acids, silicates and, preferably, bleaching earths, using the process described in the European unexamined laid-open application No. 3112. Different 1,2-alkylene oxides as well as mixtures of different compounds with active hydrogen can be used simultaneously in a reaction batch.

The molar ratio of the used amount of the tetrahydrofuran and the amount of 1,2-alkylene oxide or carboxylic anhydride is in the range, for example, from 50:1 to 5:1, preferably from 25:1 to 10:1. What is important is that during the addition of 1,2-alkylene oxide or carboxylic anhydride, steps are taken to ensure that the concentration thereof in the reaction mixture is kept below 1 wt. %. It is advisable to keep the molar ratio of the monomers in contact with the catalyst as constant as possible for most of the reaction time, preferably for 80–99% of the total reaction time. Only during the post-reaction time can the concentration of alkylene oxide be allowed to drop to 0 as the last of it reacts. The desired constancy of the alkylene oxide concentration in the reaction mixture is achieved by adding the alkylene oxide or carboxylic anhydride to the monomer mixture at the same rate as its concentration decreases as a result of polymerization. With copolymers, the amount of alkylene oxide polymerized over the entire reaction period can vary within very wide limits. Copolymers which can be processed to valuable end products contain, for example, 5 to 50, in particular 10 to 30 wt. % of alkylene oxide.

It is of advantage to ensure that all of the alkylene oxide or carboxylic anhydride has reacted before the reaction is stopped. Excess tetrahydrofuran, by contrast, which in the absence of alkylene oxide or carboxylic anhydride undergoes no further catalytic reaction, remains in the mixture as a solvent for the copolymer. The polymer concentration in the tetrahydrofuran is, for example, in the range from 30 to 60 wt. %.

It is of advantage if polymerization with the stationary or agitated fixed-bed catalyst is carried out at a temperature in the range from 0° to 70° C., preferably from 30° to 60° C., under standard pressure.

According to the preferred procedure, the mixture of starting materials for the polymerization reaction is passed through the reactor, the reaction mixture leaving the reactor being adjusted to the desired, and as constant as possible concentration by renewed addition of alkylene oxide or acid anhydride. The compound with reactive hydrogen is in most cases, added at the start of the reaction, its concentration being adjusted relative to the tetrahydrofuran. The compound containing reactive hydrogen can also be added continuously if desired, but this practice is generally avoided. The reaction mixture for the copolymerization, in which the concentration of alkylene oxide is continuously kept as constant as possible throughout the reaction time, is circulated over the fixed-bed catalyst until the desired quantity of alkylene oxide which the copolymer is later required to contain has been added to the predetermined quantity of tetrahydrofuran. For the homopolymerization reaction the concentration of carboxylic acid anhydride in the feed mixture is adjusted in accordance with the desired molecular weight.

In general, the time needed to complete the reaction is between 2 and 20 hours, preferably between 4 and 10 hours.

The pure polymer is isolated from the reaction product by evaporating off the unreacted tetrahydrofuran, which can be used again for another polymerization.

The polymerization reaction is exothermic. In order to keep the temperature constant it is therefore necessary to cool the reactor itself or else to cool the reaction mixture flow as it circulates outside the reactor.

The polymerization products obtained, especially those with molecular weights of 300–5000, are excellently suited for the production of polyurethanes or polyesters. If carboxylic acids or carboxylic acid anhydrides are used as initiators for the polymerization, one obtains predominantly esters which, as already mentioned, must be hydrolyzed to glycols before they can react with diisocyanates or dicarboxylic acids. The final polymer products derived from the polymers have a high mechanical performance, and further a good low-temperature resistance, resistance to microbes and saponification resistance. Compared to high-molecular-weight polytetramethylene ether glycol the copolymers have a lower solidification point and lower viscosity. They can thus be processed further without requiring an additional liquefaction or melting process.

The process according to the invention has the considerable advantage that practically no byproducts—in particular only very small quantitites of cyclic oligomers—are formed during the polymerization, and that the reaction can be continued until the 1,2-alkylene oxide, the carboxylic anhydride and the compound with reactive hydrogen have reacted completely. Unexpectedly and not easily explained on the basis of experience gathered in the field of polymerization, the polymers synthesized according to the invention have a very narrow molecular weight distribution; for polymers with a molecular weight between 1000 and 1500, for instance, it is in the range of a heterogeneity quotient $M_w/M_n$ of 1.2 to 2.4. By contrast, the polymers obtained from hitherto known continuous and discontinuous processes and having molecular weights between 1000 and 1500 have an average heterogeneity quotient $M_w/M_n$ of between 1.5 and 2.5.

Polymers with a narrow molecular weight distribution, especially when processed further to polyurethanes or polyesters, are more suitable to provide products with valuable mechanical properties than are products which are extremely heterogeneous in respect of their molecular weight distribution. Another unexpected advantage of the process according to the invention is that copolymers are obtained which have very low color indices. This is unexpected because it is known to those skilled in the art that polymers obtained by way of cationic polymerization are usually strongly colored and have to be refined using additional measures such as hydrogenation. The polymers have two hydroxyl or ester group equivalents per molecule. Astonishingly, the copolymeric products are also almost 100% bifunctional, although it is known that alkylene oxide polymers are as a rule not strictly bifunctional. This highly desirable feature is among other things a result of using the catalyst in granular form.

It is an important advantage of the process that the reaction mixtures, which contain the polymers in concentrations from 40 to 60%, need to be freed only of excess tetrahydrofuran prior to the final application, for example the production of polyurethanes. The tetrahydrofuran, which is expediently removed by distillation under vacuum, can be used again for the reaction without needing to be purified.

The following examples serve to explain the process of the invention in more detail, without implying any limitations. Parts are parts by weight and bear the same relation to parts by volume as that of kilograms to liters.

DETAILED DESCRIPTION OF THE PREFERRED EMBODIMENTS

EXAMPLE 1

An anhydrous aluminium silicate with the designation Perlkat PY 115 (vendor: Solvay Catalyst GmbH, Hanover, Germany) and composed of 55% $SiO_2$ and 45% $Al_2O_3$, particle size 3–5 mm, was introduced into a Duran glass laboratory flask from Schott, Mainz, preheated to 50° C. in a water bath and covered with 300 g of a mixture consisting of 91.5 wt. % THF and 0.5 wt. % acetic anhydride. The flask, tightly sealed with a propylene screw cap, was rotated slowly about its longitudinal axis for 10 hours in the water bath at 50° C. in order to keep the catalyst bed in gentle motion. At hourly intervals a 3 g portion—8 portions altogether—of acetic anhydride was added to the reaction mixture. The catalyst has beforehand been converted into the protonated form by washing with 3% hydrochloric acid and drying at 550° C. The reaction mixture was then decanted off from the catalyst and analyzed. The acid number of the reaction product indicates that at least 99% of the acetic anhydride had reacted.

The unreacted THF was evaporated off at 150° C. and 5 mbar from the formed polytetramethylene ether glycol diacetate that was present in the reaction solution in a concentration of 56% by weight. The saponification number of the diester was 152.6 mg KOH/g, which corresponds to a molecular weight of 734 g/mol. By means of transesterification with the same amount of methanol in the presence of, for example, 0.01 wt. % sodium methylate, PTMEG was obtained therefrom with a hydroxyl number of 173 mg KOH/g and a color index 5 APHA. The acid number is <0.01 mg KOH/g. The product exhibits a very narrow molecular weight distribution. The heterogeneity quotient (polydispersity) $M_w/M_n$ is only 1.18, indicating an extremely narrow molecular weight distribution. The proportion of oligomeric cyclic ethers is less than 0.01 wt. %.

EXAMPLE 2

The polymerization is carried out at 50° C. with the same experimental setup as described for Example 1, using the commercial granular catalyst Perlkat PY115 (vendor: Solvay catalyst GmbH, Hanover, Germany), 55 wt. % $SiO_2$, 45 wt. % $Al_2O_3$, which consists of amorphous aluminium silicate and zeolite. The granular catalyst with dimensions of approximately 3 mm, had been washed in advance with 5 wt. % aqueous hydrochloric acid and dried at 550° C. for 2 hours until the weight remained constant.

For the polymerizaion use was made of 9 g of acetic anhydride and 300 g of THF. After 5 hours of polymerization the acetic anhydride had reacted to an extent of over 99% and the polymer solution contained 53 wt. % PTMEG diacetate with an ester number of 61.2 (corresponds to a molecular weight of 1824 g/mol). By means of slurry-phase hydrogenation at 220° C. and 250 bar hydrogen on a fixed-bed barium-oxide-activated copper chromite catalyst G22 (vendor: Sud-Chemie AG, Munich, in 40 wt. % methanol solution, it was reduced and stabilized, being converted into polytetramethylene ether glycol with a hydroxyl number of 64.1 (molecular weight 1750 g/mol). The polymer is very homogeneous, exhibiting a polydispersity $M_w/M_n=1.5$ in the GPLC analysis. The color index is 5 APHA and the acid number less than 0.01 mg KOH/g.

EXAMPLE 3 (see FIGURE)

Commercial technical-grade tetrahydrofuran was purified according to example 1 of the European Patent No. 3112.

As catalyst use is made in this example of the commercial cracking catalyst designated Perlkat PY 113 (vendor: Solvay Catalyst GmbH, Hanover, Germany), a homogeneous, zeolite-containing amorphous silicon dioxide - aluminium oxide catalyst with a particle size of 3–5 mm.

Polymerization was carried out in an apparatus the principle of which is shown in the figure. The dried catalyst was introduced into the reaction tube (1), provided with a thermostatically regulated cooling jacket and having a capacity of 5000 parts by volume and a diameter: length ratio of about 1:10. The stock vessel (2), having a useful volume of 7000 parts by volume, was charged with 5000 parts of purified THF, 43 parts of water and 10.3 parts of ethylene oxide. The tetrahydrofuran (4), water (5) and ethylene oxide (3) were taken from their respective reservoirs. This mixture of starting compounds was transferred to the catalyst bed (1), which was kept at a temperature of 47° to 49° C. As soon as the catalyst bed had been filled with fresh feed, the same amount of fresh feed was prepared once again in the stock vessel and then passed continuously over the catalyst bed. The overflow returned to the stock vessel (2). The ethylene oxide concentration in stock vessel (2) was kept constant at 0.1 wt. % by continuously introducing ethylene oxide gas from reservoir (3) into the feed mixture in the stock vessel (2). An input of 35 parts of ethylene oxide per hour was necessary to maintain this concentration in the feed mixture. After a reaction time of 9 hours, 325 parts of ethylene oxide had been introduced into the reaction mixture. The reaction mixture was then left to post-react at 49° C. It was circulated from the stock vessel (2) over the catalyst (1) at a pumping rate of 15000 parts by volume per hour, which was kept constant during the entire test duration. Thereafter, the ethylene oxide concentration in the feed mixture had dropped to 0 wt. %. The total amount of ethylene oxide introduced and reacted amounted to 315 parts.

5350 parts of reaction mixture were discharged from the stock vessel (2). This first reaction mixture was discarded. The stock vessel was then recharged with 5500 parts of fresh feed consisting of 98.3% tetrahydrofuran, 0.7% water and 0.2% ethylene oxide. This mixture was then circulated through the catalyst bed (1) at a pumping rate of 12000 parts by volume per hour. At the same time 36 parts of ethylene oxide gas per hour were introduced into the reaction vessel (1), as a result of which the ethylene oxide concentration in the stock vessel was kept at 0.1%. After 9 hours the supply of ethylene oxide was cut off. The reaction mixture was circulated for a further four hours at an hourly pumping rate of 12000 parts by volume. The reaction product in the stock vessel (2) was discharged and the stock vessel recharged as described above with the mixture of tetrahydrofuran, water and ethylene oxide. Polymerization was then carried out as described above for 9 hours, with an additional 4 hours for the post treatment. The reaction mixture thus obtained hardly differed from those obtained in 100 further polymerization batches of this type.

To isolate the copolymer the colorless reaction mixture (color index <5 APHA) was concentrated by evaporation, first under standard pressure and then under vacuum at 1 mbar, up to 200° C. in a film evaporator. The resulting distillate consisted of 98% pure THF and of 0.8% low-molecular-weight copolymers with an average molecular weight of about 250. From the amount of copolymer obtained by concentration, it was calculated that 45% of the tetrahydrofuran used had reacted. All of the ethylene oxide used had reacted, being contained quantitatively in a proportion of approximately 15 wt. % in the copolymer obtained. From the hydroxyl number of the copolymer its molecular weight was calculated to be 1260. The heterogeneity, determined by gel permeation chromatography (GPC), of the copolymer was $M_n/M_w=1.25$, the color index was less than 5 APHA and the acid number was below the detectability limit of 0.01 mg KOH/g. Cyclic oligomeric ethers were not detectable in the reaction product.

EXAMPLE 4

195 parts of commercial granulated $SiO_2$—$Al_2O_3$ catalyst (Perikat PY 115, Solvay Catalyst GmbH, Hanover) with a particle size of 3 mm were introduced into a thermostatically regulated and agitated reaction volume. Prior to this the catalyst had been soaked in 7 wt. % aqueous hydrochloric acid and then dried at 650° C. for 2 hours until the weight remained constant. Then the reaction vessel was charged with a mixture of 950 parts of tetrahydrofuran and 40 parts of formic acid. 10 parts of propylene oxide per hour were then added at a uniform rate and over a period of five hours to the mixture, which was agitated. In this way, the propylene oxide concentration in the reaction mixture was kept constant at 0.08 wt. %. The reaction temperature was 50° C. After all the propylene oxide had been added, the reaction mixture was agitated for another four hours at reaction temperature. The resulting copolymer solution was separated from the catalyst by filtering. The filtrate was free of propylene oxide and consisted of 43% copolymer and 57% unreacted tetrahydrofuran, as was determined by evaporation at standard pressure and under vacuum. The solvent-free copolymer had a saponification number of 37 mg KOH/g and a hydroxyl number of 13 mg KOH/g. The product contained less than 0.5% cyclic oligomeric ethers. The ester-containing polymer was then diluted with an equal amount of methanol and after addition of 10 parts of calcium hydroxide it was transesterified under standard pressure at 32° C. to glycol by distillation on a column with 20 theoretical trays, the methyl formate being distilled off. When the transesterification was complete, the calcium hydroxide used as transesterification catalyst was filtered off and the methanolic solution of the copolymer was concentrated by evaporation—first under standard pressure and later under vacuum—using a film evaporater. The polymer obtained was esterfree pure glycol, and had a hydroxyl number of 51 mg KOH/g, which corresponds to a molecular weight of 2210. The $^{13}C$ NMR spectrum showed that the copolymer had been formed from approximately 10% propylene oxide and 90% tetrahydrofuran. The product's dispersity $M_w/M_n$ was 1.3. The color index was under 5 APHA and the acid number less than 0.01 mg KOH/g.

A practically identical copolymer is obtained if, instead of the catalyst Perlkat PY 115, use is made as catalyst of 5 mm beads of protonated kaolin that has been calcined at 650° C.

Process for the preparation of tetrahydrofuran polymers

It is claimed:

1. A process for the discontinuous or continuous production of a polytetramethyleneetherglycoldiester or a polyoxybutylenepolyoxyglycol comprising homopolymerizing or copolymerizing tetrahydrofuran with a 1,2-alkylene oxide in the presence of a carboxylic acid anhydride or a compound having reactive hydrogen at a concentration of 0.1 to 50 mol % relative to said tetrahydrofuran, said homopolymerizing or copolymerizing being carried out on a protonated and calcined aluminum silicate catalyst consisting of kaolin, amorphous aluminum silicate, or a mixture of amorphous aluminum silicate and zeolite wherein one of said 1,2-alkylene oxide or carboxylic acid anhydride is fed to a reaction mixture to maintain a constant concentration below 1 wt % during homopolymerization or copolymerization.

2. The process of claim 1, wherein said catalyst is a fixed bed consisting of molded articles having an average diameter of 0.5–10 mm.

3. The process of claim 1, wherein said 1,2-alkylene oxide is ethylene oxide, 1,2-propylene oxide, or a mixture thereof.

4. The process of claim 1, wherein said carboxylic acid anhydride is acetic anhydride.

5. The process of claim 1, wherein said reactive hydrogen containing compound is water.

6. The process of claim 1, wherein said reactive hydrogen containing compound is a carboxylic acid having from 1 to 8 carbon atoms.

7. The process of claim 1, wherein said tetrahydrofuran and said 1,2-alkylene oxide or carboxylic acid anhydride are maintained at a molar ratio between 30:1 and 5:1.

8. The process of claim 1, wherein said homopolymerizing or copolymerizing is carried out at a temperature of 0°–70° C. under ambient pressure.

9. The process of claim 2, wherein said molded articles have an average diameter of from 1–8 mm.

10. The process of claim 1 wherein ester groups of said polymer are at least partially saponified.

* * * * *

UNITED STATES PATENT AND TRADEMARK OFFICE
CERTIFICATE OF CORRECTION

PATENT NO. : 5,886,138
DATED : March 23, 1999
INVENTOR(S) : Herbert MÜLLER

It is certified that error appears in the above-identified patent and that said Letters Patent is hereby corrected as shown below:

In column 1, line 8, change "relation" to -- invention --.

In column 3, line 7, after "invention" insert -- . --; set "Detailed Description" as a separate, centered line.

In column 3, line 24, change "branch ed" to -- branched --.

In column 8, line 29, change "Sud" to -- Süd --.

Signed and Sealed this

Eleventh Day of July, 2000

Attest:

Q. TODD DICKINSON

Attesting Officer

Director of Patents and Trademarks